United States Patent
Cueto et al.

(10) Patent No.: US 9,588,979 B2
(45) Date of Patent: Mar. 7, 2017

(54) UI TECHNIQUES FOR NAVIGATING A FILE MANAGER OF AN ELECTRONIC COMPUTING DEVICE

(71) Applicant: BARNES & NOBLE COLLEGE BOOKSELLERS, LLC, Basking Ridge, NJ (US)

(72) Inventors: Gerald B. Cueto, San Jose, CA (US); Dale J. Brewer, San Marcos, CA (US); Michael Wilson, Los Angeles, CA (US)

(73) Assignee: BARNES & NOBLE COLLEGE BOOKSELLERS, LLC, Basking Ridge, NJ (US)

( * ) Notice: Subject to any disclaimer, the term of this patent is extended or adjusted under 35 U.S.C. 154(b) by 216 days.

(21) Appl. No.: 14/144,900

(22) Filed: Dec. 31, 2013

(65) Prior Publication Data

US 2015/0186397 A1    Jul. 2, 2015

(51) Int. Cl.
| | | |
|---|---|---|
| G06F 17/30 | (2006.01) | |
| G06F 3/0481 | (2013.01) | |
| G06F 3/0482 | (2013.01) | |
| G06F 3/0488 | (2013.01) | |

(52) U.S. Cl.
CPC ...... *G06F 17/30126* (2013.01); *G06F 3/0482* (2013.01); *G06F 3/0488* (2013.01); *G06F 3/04817* (2013.01); *G06F 3/04883* (2013.01)

(58) Field of Classification Search
CPC .............. G06F 3/04817; G06F 3/0488; G06F 3/04883; G06F 3/0482; G06F 17/30126
See application file for complete search history.

(56) References Cited

U.S. PATENT DOCUMENTS

| | | |
|---|---|---|
| 4,896,543 A | 1/1990 | Gullman |
| 5,633,471 A | 5/1997 | Fukushima |

(Continued)

FOREIGN PATENT DOCUMENTS

EP    0722150 A1    7/1996

OTHER PUBLICATIONS

"Adonit Jot Touch (for iPad)," Adonit Jot Touch (for iPad) Review and Rating—PCMag.com; http://www.pcmag.com/article2/0,2817,2411192,00.asp; printed from the Internet on Jun. 20, 2013, 6 pages.

(Continued)

*Primary Examiner* — Aaron Lowenberger
(74) *Attorney, Agent, or Firm* — Finch & Maloney PLLC

(57) ABSTRACT

Techniques are disclosed for a swipe based file manager navigation mode in electronic computing devices, such as a touch screen device. Digital files may be organized in a hierarchical or treelike file manager capable of having multiple directory or folder levels. Folders (or directories) may allow a user to group files into separate collections, and folders may be organized within other folders. In some embodiments, the navigation mode may allow a user to navigate through or access the directory levels of the file manager using vertical swipe gestures. In some such embodiments, a vertical gesture performed to access a child (lower) directory level may have to be performed over the directory or folder to be accessed. As the user navigates through the directory levels, the navigation mode may be configured, in some embodiments, to provide animations.

20 Claims, 10 Drawing Sheets

(56) References Cited

U.S. PATENT DOCUMENTS

| | | | |
|---|---|---|---|
| 5,844,557 A | 12/1998 | Shively, II | |
| 6,259,438 B1 | 7/2001 | Fleck et al. | |
| 6,334,157 B1 | 12/2001 | Oppermann et al. | |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 2001/0025289 A1 | 9/2001 | Jenkins et al. | |
| 2002/0116421 A1 | 8/2002 | Fox et al. | |
| 2005/0131945 A1* | 6/2005 | Muller et al. | 707/104.1 |
| 2005/0212760 A1* | 9/2005 | Marvit et al. | 345/156 |
| 2006/0015818 A1* | 1/2006 | Chaudhri et al. | 715/779 |
| 2007/0047002 A1 | 3/2007 | Hull et al. | |
| 2007/0177803 A1* | 8/2007 | Elias et al. | 382/188 |
| 2008/0036747 A1 | 2/2008 | Hope | |
| 2008/0122796 A1* | 5/2008 | Jobs | G06F 3/0488 345/173 |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0258542 A1 | 10/2011 | Kenney et al. | |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0303548 A1* | 11/2012 | Johnson et al. | 705/36 R |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139102 A1* | 5/2013 | Miura et al. | 715/788 |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |
| 2013/0239059 A1* | 9/2013 | Chen et al. | 715/835 |
| 2013/0332378 A1* | 12/2013 | Brown et al. | 705/319 |
| 2014/0013242 A1* | 1/2014 | Beresford-Wood | G06Q 10/103 715/753 |
| 2014/0223357 A1* | 8/2014 | Ording et al. | 715/781 |

OTHER PUBLICATIONS

Volpe, Joseph, Amazon patents intelligent pen for adding annotations to digital and printed media (updated), http://www.engadget.com/2012/03/06/amazon-patents-intelligent-pen/, posted Mar. 6, 2012 at 5:39 PM, 3 pages.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, published Feb. 28, 2013, 13 pages.

"Bamboo Stylus," Wacom Americas, http://www.wacom.com/en/products/stylus, printed from the Internet on Jun. 20, 2013, 5 pages.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, printed from the Internet on Aug. 2, 2013, 1 page.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9/10/04, 10 pages.

"Pen," DuoSense Pen, N-trig Hands-on computing, http://www.n-trig.com/Content.aspx?Page=DigitalPencil, printed from the Internet on Jun. 20, 2013, 3 pages.

"Easing functions," Easing Functions Cheat Sheet, http://easings.net/, printed from the Internet on Jun. 17, 2013, 3 pages.

Kirupa, Easing Functions (aka Timing Functions) in CSS3, http://www.kirupa.com/html5/easing_functions_css3.htm, published Apr. 3, 2013, 16 pages.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, printed from the Internet on Aug. 2, 2013, 5 pages.

"Simultaneous Pen & Touch: The Natural Way to Work," Perceptive Pixel Active Stylus, www.perceptivepixel.com/_literature_136086/Active_Stylus, printed from the Internet on Dec. 14, 2012, 2 pages.

"Future Apple Notebooks & Tablets may use Acoustic Commands—Patently Apple," http://www.patentlyapple.com/patently-apple/2011/02/future-apple-notebooks-tablets-may-use-acoustic-commands.html, published Feb. 18, 2011, 6 pages.

"Guidelines for selecting text and images (Windows Store apps)," http://msdn.microsoft.com/en-us/library/windows/apps/hh465334, printed from the Internet on Jun. 20, 2013, 5 pages.

Lutz, Zachary, "Hands-on with wireless, ultrasonic stylus an touchless gestures at MWC (video)," http://www.engadget.com/2012/03/01/hands-on-with-wireless-ultrasonic-stylus-and-touchless-gestures/, posted Mar. 1, 2012 at 8:28 AM, 3 pages.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, printed from the Internet on Jun. 20, 2013, 6 pages.

"How do WACOM tablets work?," tablet4u.co.uk, http://www.tablet4u.co.uk/techinfo.html, printed from the Internet on Jun. 20, 2013, 2 pages.

Kim, Arnold, "Multi-Touch Page Flipping eBook Concept Shown on an iPad," http://www.macrumors.com/2012/01/23/multi-touch-page-flipping-ebook-concept-shown-on-an-ipad/, posted Jan. 22, 2012 at 10:52 PM, 6 pages.

"Desktop Touchscreens,"—Desktop touchscreens explained, http://www.touchscreenmagazine.nl/touchscreen-solutions/desktop-touchscreens, printed from the Internet on Nov. 3, 2012, 1 page.

"MTStylus Wireless Stereo Stylus for iPhone/Andriod Phone & Tablet," dexim-MTStylus Wireless Stereo Stylus, http://www.dexim.net/content.php?id=165&pid=11, printed from the Internet on Jun. 20, 2013, 2 pages.

"Padblue 2," Brando—mobile.brando.com, http://mobile.brando.com/Padblue-2_p9162c1577d94.html., printed from the Internet on May 10, 2013, 4 pages.

Fingas, Jon, "Panasonic mobile devices to use Anoto's pattern-based pen input technology," http://www.engadget.com/2013/01/08/panasonic-mobile-devices-to-use-anoto-pattern-pen-input/, posted Jan. 8, 2013 at 1:00 PM, 4 pages.

"Bluetooth 4.0 SmartPen The future just got a little brighter," Pogo Connect, http://tenonedesign.com/connect.php, printed from the Internet on Jun. 20, 2013, 7 pages.

Quick, Darren, "Pressure sensitive technology set to bring 3D capability to touchscreens," Mobile Technology, http://www.gizmag.com/new-touchscreen-technology, published on Jan. 31, 2010, 4 pages.

Rigg, Jamie, "Sony tries to patent stylus with friction-based haptic feedback," http://www.engadget.com/2012/11/22/sony-haptic-feedback-stylus-patent/, posted on Nov. 22, 2012 at 9:50 AM, 2 pages.

"Stylus Hanging Bluetooth Headset," BRANDO—mobile.brando.com, http://mobile.brando.com/prod_detail.php? prod_id=03291, printed from the Internet on May 10, 2013, 4 pages.

"The JukeStyle is a great budget stylus for your iOS devices," stylus Archives—iPad News, http://www.ipadnews.nl/tag/stylus/, printed from the Internet on Jun. 20, 2013, 44 pages.

Lavrinc, Damon, "Why Flipping Through Paper-Like Pages Endures in the Digital World," Gadget Lab, http://www.wired.com/gadgetlab/2012/05/why-flipping-through-paper-like-pages-endures-in-the-digital-world/, posted on May 11, 2012 at 3:48 PM, 5 pages.

Bragdon, et al., "Experimental Analysis of Touch-Screen Gesture Designs in Mobile Environments", CHI 2011—Session: Gestures, May 7-12, 2011, Vancouver, BC, Canada. Copyright 2011 ACM 978-1-4503-0267-8/11/05, pp. 403-412.

"Gesture Search for Google Mobile", Google Mobile, www.google.com/mobile/gesture-search, printed from the Internet on Dec. 26, 2012, 1 page.

"Comics by comiXology," Comic Book Reader Guide, http://www.comicbookreaderguide.com/comics-by-comixology/, printed from the Internet on May 6, 2013, 24 pages.

"NFC Forum: Frequently Asked Questions," http://www.nfc-forum.org/resources/faqs#acknowledge, printed from the Internet on Feb. 18, 2013, 11 pages.

"How to Remote Wipe an iPhone or iPad," OSXDaily, http://osxdaily.com/2012/06/05/remote-wipe-iphone-or-ipad/, published Jun. 5, 2012, 4 pages.

"Screen hotspot," Wikipedia, the free encyclopedia, http://en.wikipedia.org/wiki/Screen_hotspot, printed from the Internet on May 15, 2013, 1 page.

"PAiA-Touch Switches," copyright 2006 PAiA Corporation USA, http://www.paia.com/ProdArticles/touchsw.html, printed from the Internet on Aug. 27, 2013, 3 pages.

Kanai, et al., "Intra-Rendition Navigation," Copyright 2012-2013 International Digital Publishing Forum (IDPF), 13 pages.

"Explaining how the sPen tech works (and is very diff than other styluses)," http://forum.xda-developers.com/showthread.php?t=1439369, posted Jan. 11, 2012, 8:20 AM, 1 page.

"Navigation Drawer," http://developer.android.com/design/patterns/navigation-drawer.html, downloaded from the internet on Dec. 20, 2013, 14 pages.

* cited by examiner

UI TECHNIQUES FOR NAVIGATING A FILE MANAGER OF AN ELECTRONIC COMPUTING DEVICE

FIELD OF THE DISCLOSURE

This disclosure relates to electronic display devices, and more particularly, to user interface (UI) techniques for interacting with computing devices.

BACKGROUND

Electronic display devices such as tablets, eReaders, mobile phones, smart phones, personal digital assistants (PDAs), and other such touch screen electronic display devices are commonly used for displaying consumable content. The content may be, for example, one or more eBooks, images, video or music files, document files, an online article or blog, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figure 1A:
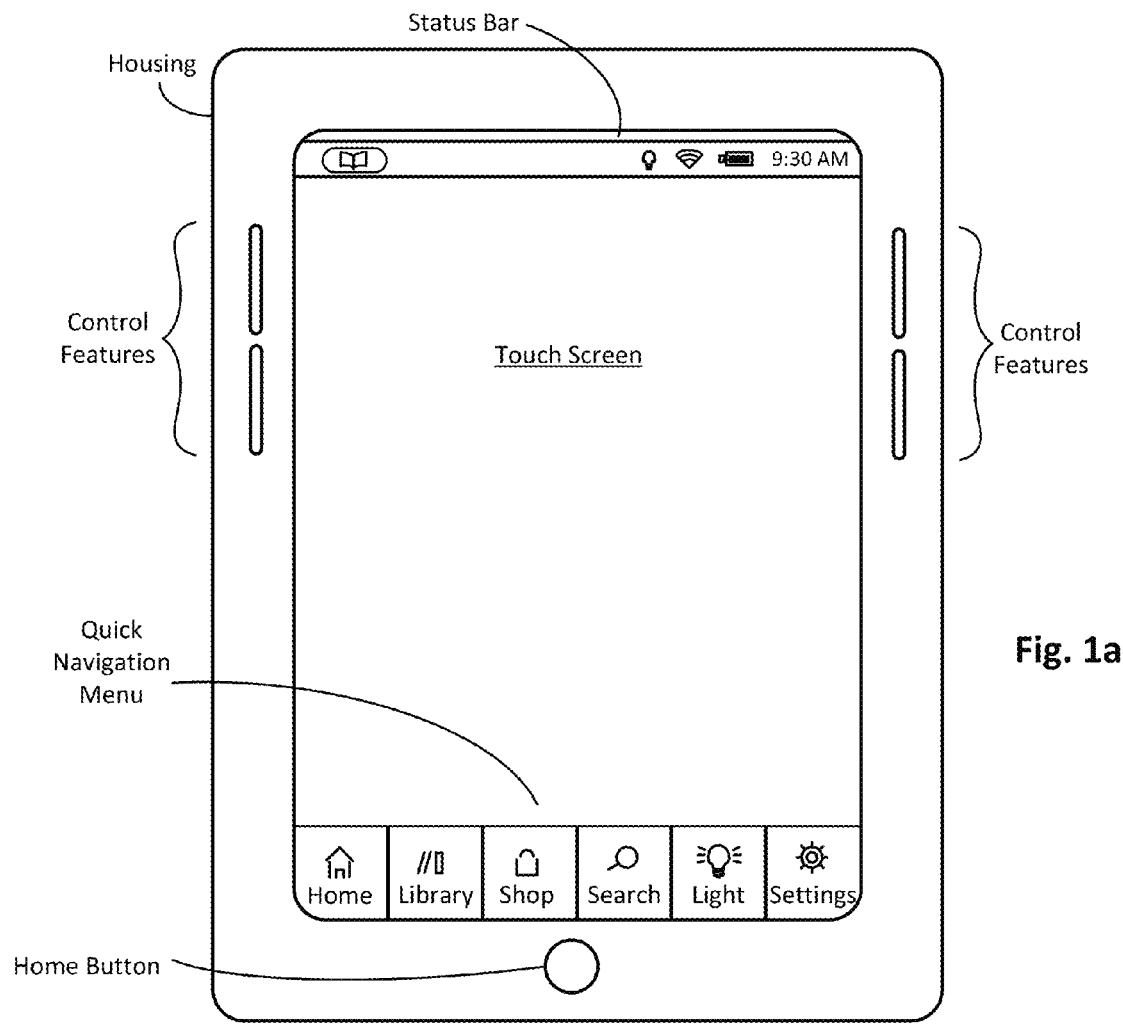
FIGS. 1a-b illustrate an example electronic touch screen device having a swipe based file manager navigation mode configured in accordance with an embodiment of the present invention.

Techniques are disclosed for a swipe based file manager navigation mode in electronic computing devices, such as a touch screen device. Digital files may be organized in a hierarchical or treelike file manager capable of having multiple directory or folder levels. Folders (or directories) may allow a user to group files into separate collections, and folders may be organized within other folders. In some embodiments, the navigation mode may allow a user to navigate through or access the directory levels of the file manager using vertical swipe gestures. In some such embodiments, a vertical gesture performed to access a child (lower) directory level may have to be performed over the directory or folder to be accessed. As the user navigates through the directory levels, the navigation mode may be configured, in some embodiments, to provide animations showing the content collapsing into parent (higher) directory levels (e.g., files collapsing into a source folder) or expanding out into child (lower) directory levels (e.g., a folder expanding to show the files and/or folders it contains), when the user navigates up or down the hierarchical structure, respectively. Numerous variations and configurations will be apparent in light of this disclosure.

General Overview

As previously explained, electronic display devices such as tablets, eReaders, and smart phones are commonly used for displaying user interfaces and consumable content, such as digital files. In some instances, the digital files may be organized in a hierarchical or treelike file system or file manager capable of having multiple directory levels. The directories (sometimes referred to as folders) may allow a user to group files into separate collections. While some user interfaces provide methods of navigating through the hierarchical or treelike file manager structure (having multiple directories), such conventional techniques may be complex, include multiple processes or steps, and/or be unintuitive for users, which may lead to a diminished user experience.

Thus, and in accordance with an embodiment of the present invention, techniques are disclosed for a swipe based file manager navigation mode in electronic computing devices, such as a touch screen device. In one example embodiment, the user may perform an upward or downward oriented swipe gesture on a touch screen display in order to switch hierarchical views and view a higher or lower file manager or directory level. In some embodiments, an animation may be displayed showing a collapsing or expanding stack of content icons, or some other graphic or animation accompanying the file manager navigation. The content being navigated may be, for example, a virtual folder, menu, album, database, library, or other directory that includes a number of files therein (e.g., pictures, songs, movies, documents, and/or programs), just to name a few types. In some embodiments, the techniques described herein may be implemented to navigate through content using, for example, an Internet browser, a file or folder browser, or any suitable file manager interface. In other embodiments, the swipe based file manager navigation techniques may be combined with drag-and-drop UI techniques, or other UI techniques to aid in organizing and otherwise interacting with folders and files. Numerous other example applications and uses will be appreciated in light of this disclosure.

In one embodiment, as the user navigates toward a higher level of the content hierarchy, an animation of digital content icons collapsing into one or more stacks or source folders may be displayed or otherwise presented to the user. The digital content icons may fold together like origami, collapse into a stack, or folder, or collapse like an accordion, in some example embodiments. In one example, if the user navigates toward an even higher level within the content hierarchy, an animation of the stacks and/or folders collapsing into an even larger stack or folder may be displayed or otherwise presented to the user. Similarly, navigating toward a lower level of the content hierarchy may show the digital content icons unfold or expand in a reverse animation of the ones just described.

In one example, multiple levels of the content hierarchy may be displayed or otherwise presented to the user at the same time. In one such example, a file manager or directory level division, such as a line, dashed line, or other division indicator may be displayed between levels of the file manager in order to illustrate separate levels within the content hierarchy. When multiple levels are displayed at once, the levels may appear as an expanding file tree, in some embodiments. In such an example, the user may wish to identify the source folders (also called the parent folders) for the content displayed in the lower directory levels. As used herein, the term folder may refer to a virtual file folder, a database, a directory location, or any element of a file hierarchy allowing a user to access one or more files, applications, folders, and/or sub-folders. In one example, the source or parent folders for the current content displayed in the lower levels of the file manager may be shaded, highlighted, or otherwise altered in appearance or size so that the user may distinguish which folders higher up the file tree are associated with the content displayed in the lower levels of the file tree. In still other embodiments, the upper levels in the file tree may only display the source folders for the lower levels of content, such that the user automatically knows the content source.

As used herein, a swipe gesture may include a sweeping or dragging gesture across at least a portion of the touch sensitive surface; whether directly contacting that surface or hovering over that surface (e.g., within a few centimeters or otherwise close enough to be detected by the touch sensitive surface). In some embodiments, the swipe gesture may be performed at a constant speed in one single direction, while in other embodiments the swipe gesture may follow a curved path or otherwise non-straight path. The gestures can be performed, for example, with the tip of a finger or a stylus, or any other suitable implement capable of providing a detectable swipe gesture. Given the global nature and/or uniqueness of the engagement mechanism, in accordance with some example embodiments, the swipe based file manager navigation techniques described herein can be similarly enabled within multiple diverse applications (e.g., file browser, navigation window, etc.) and without conflicting with other global gestures that might also be used by the device's operating system. Various types of digital content can benefit from the navigation techniques described herein. For example, the digital content may include a digital catalogues, magazines, comics, eBooks, text documents, slide shows, photos, music files, programs, applications, and/or other digital content that may be accessed and navigated through using the UI of a digital computing device.

Architecture

Figure 1B:
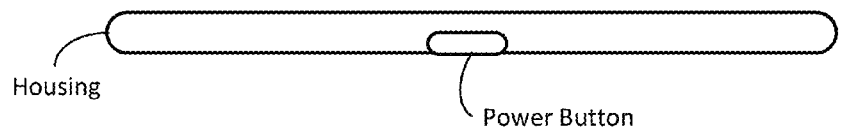

FIGS. 1a-b illustrate an example electronic touch sensitive device having a swipe based file manager navigation mode configured in accordance with an embodiment of the present invention. As can be seen, in this example embodiment, the touch sensitive surface is a touch screen display. The device could be, for example, a tablet such as the NOOK® tablet or eReader by Barnes & Noble. In a more general sense, the device may be any electronic device having a touch sensitive user interface for detecting direct touch or otherwise sufficiently proximate contact, and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated in light of this disclosure, the claimed invention is not intended to be limited to any specific kind or type of electronic device or form factor.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or UI features, or device form factor.

In this example configuration, the home button is a physical press-button that can be used as follows: when the device is awake and in use, pressing the button will display the quick navigation menu, which is a toolbar that provides quick access to various features of the device. The home button may also be configured to cease an active function that is currently executing on the device or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
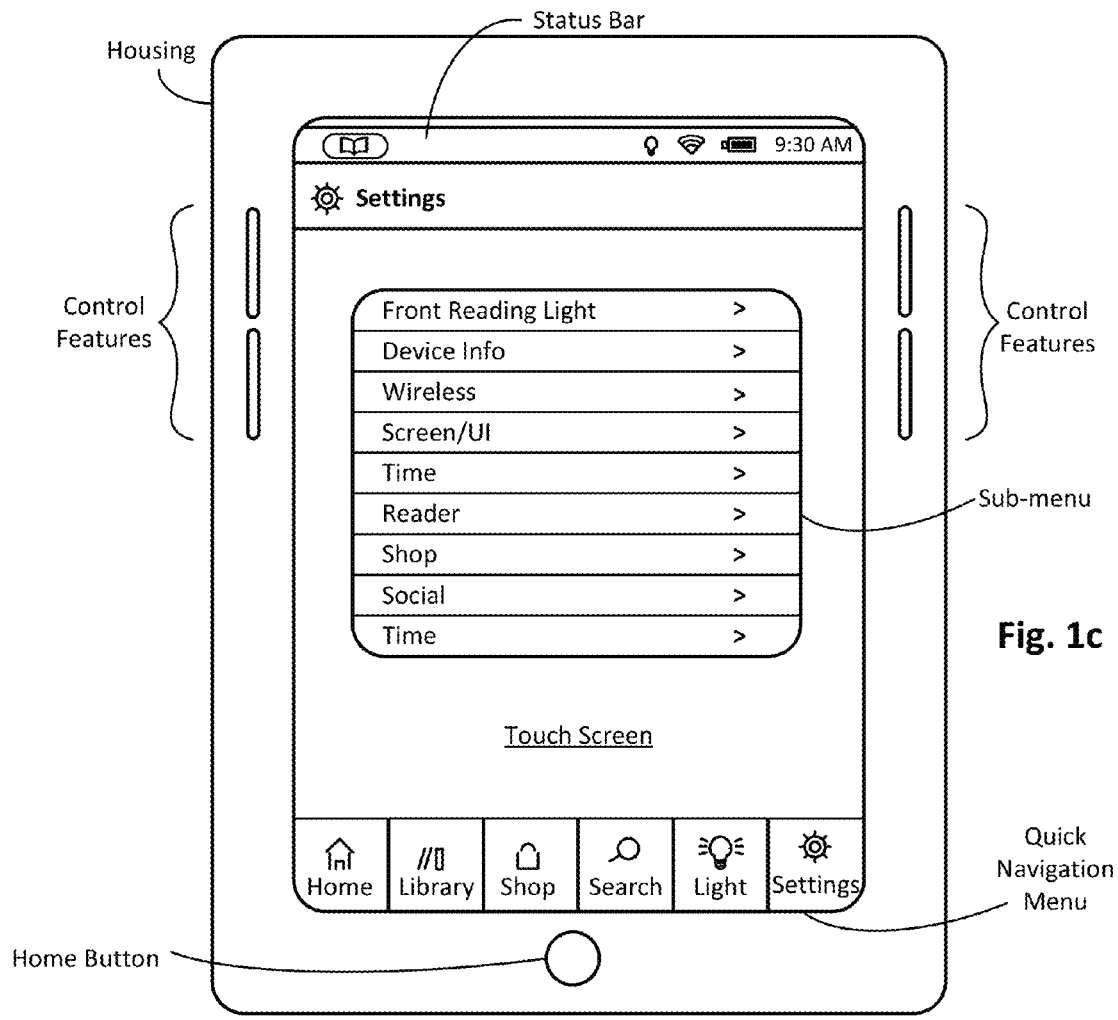
FIGS. 1c-d illustrate example configuration screen shots of the user interface of the electronic touch screen device shown in FIGS. 1a-b, configured in accordance with an embodiment of the present invention.
Figure 1D:
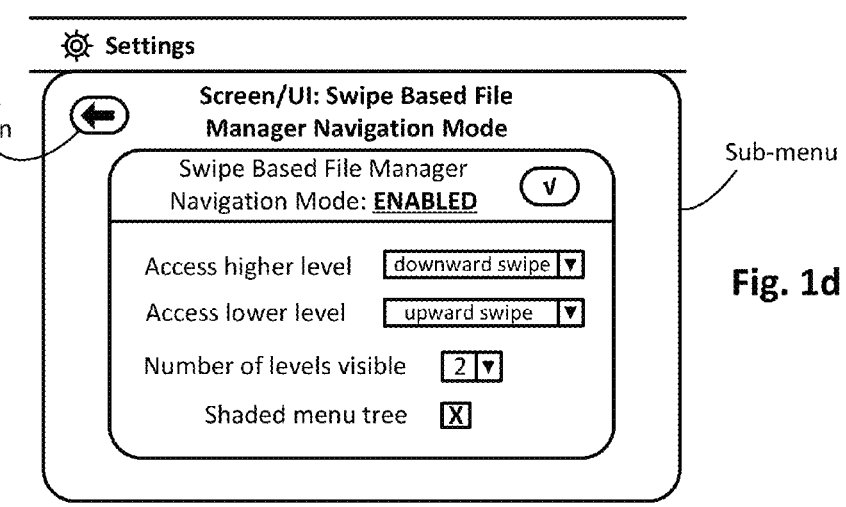

In one particular embodiment, a swipe based file manager navigation mode configuration sub-menu, such as the one shown in FIG. 1d, may be accessed by selecting the Settings option in the quick navigation menu, which causes the device to display the general sub-menu shown in FIG. 1c. From this general sub-menu, the user can select any one of a number of options, including one designated Screen/UI in this specific example case. Selecting this sub-menu option may cause the configuration sub-menu of FIG. 1d to be displayed, in accordance with an embodiment. In other example embodiments, selecting the Screen/UI option may present the user with a number of additional sub-options, one of which may include a so-called "swipe based file manager navigation mode" option, which may then be selected by the user so as to cause the swipe based file manager navigation mode configuration sub-menu of FIG. 1d to be displayed. Any number of such menu schemes and nested hierarchies can be used, as will be appreciated in light of this disclosure. In other example embodiments, the swipe based file manager navigation mode is hard-coded such that no configuration sub-menus are needed or otherwise provided (e.g., navigating through various levels of digital content using vertical swipe gestures as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a touch (direct or hovering, by a user's hand, a stylus, or any other suitable implement) in a given location into an electrical signal which is then received and processed by the device's underlying operating system (OS) and circuitry (processor, display controller, etc.). In some instances, note that the user need not actually physically touch the touch sensitive device to perform an action. For example, the touch screen display may be configured to detect input based on a finger or stylus hovering over the touch sensitive surface (e.g., within 3 centimeters of the touch screen or otherwise sufficiently proximate to be detected by the touch sensing circuitry). Additional example details of the underlying OS and circuitry in accordance with some embodiments will be discussed in turn with reference to FIG. 2a.

The touch sensitive surface (or touch sensitive display, in this example case) can be any surface that is configured with touch detecting technologies, whether capacitive, resistive, acoustic, active-stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch sensitive controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case).

As previously explained, and with further reference to FIGS. 1c and 1d, once the Settings sub-menu is displayed (FIG. 1c), the user can then select the Screen/UI option. In response to such a selection, the swipe based file manager navigation mode configuration sub-menu shown in FIG. 1d can be provided to the user, in accordance with one such example embodiment. The user can configure a number of features with respect to the swipe based file manager navigation mode, in this example case. For instance, the configuration sub-menu includes a UI check box that when checked or otherwise selected by the user, effectively enables the swipe based file manager navigation mode (shown in the enabled state); unchecking the box disables the function. Other embodiments may have the swipe based file manager navigation mode always enabled or enabled by a physical switch or button located on the device, for example.

In some embodiments, the swipe based file manager navigation mode may be associated with, among other things, a gesture for accessing a higher level and a gesture for accessing a lower level of the content hierarchy. In this particular example, the user has selected a downward swipe gesture to navigate up one level, and an upward swipe gesture, performed over the item of digital content the user wishes to explore, to access a lower level. In still other embodiments, note that a touch screen gesture is not necessarily required. For instance, in a desktop computing application having a non-touch display and a mouse, the so-called gestures may be performed by the user dragging a cursor (e.g., via a click-and-hold mouse-based drag) using a keyboard, mouse, or other suitable input mechanism. In a more general sense, any suitable user input techniques can be used to interact with the swipe based file manager navigation mode provided herein. For ease of description, examples provided herein focus on touch screen technologies.

With further reference to the example embodiment of FIG. 1d, the swipe based file manager navigation mode may also be configured to show one or more levels of content at one time, in some embodiments. In this particular embodiment, the user has selected to have three levels of content visible at one time. In one such embodiment, the multiple levels of content display a file tree to the user showing the source of the content displayed in the lower levels. In some embodiments the user may enable a shading function which may indicate to the user (e.g., by highlighting, shading, or otherwise altering folders in appearance or size) the source of content in the lower levels. In such an example, the user may easily identify the source of the lower levels of content by identifying the shaded folders in the higher levels of the file tree. As can be seen in this example, a drop-down menu has been used to select the number of levels displayed, and a touch screen UI check box has been used to enable the file tree shading option. As can be seen in this example, the various features of the swipe based file manager navigation mode have been selected or enabled using UI check boxes and drop-down menus; however, any suitable UI selection mechanism can be used. As mentioned above, many other gestures and/or features may be configured or edited with respect to the swipe based file manager navigation mode, and this example figure is not intended to limit the disclosure to any particular type of gestures and/or features.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1d is presented merely as an example of how a swipe based file manager navigation mode may be configured by the user, and numerous other configurable or hard-codable aspects will be apparent in light of this disclosure. Note that in some embodiments the swipe based file manager navigation mode may be visually and/or aurally demonstrated or otherwise confirmed to the user via animations and/or sound effects. Such animations and sound effects may be used to provide clarity to the function being performed or otherwise enhance the user experience. In some embodiments, such animations and sound effects may be user-configurable, while in other embodiments they are hard-coded.

Figure 2A:
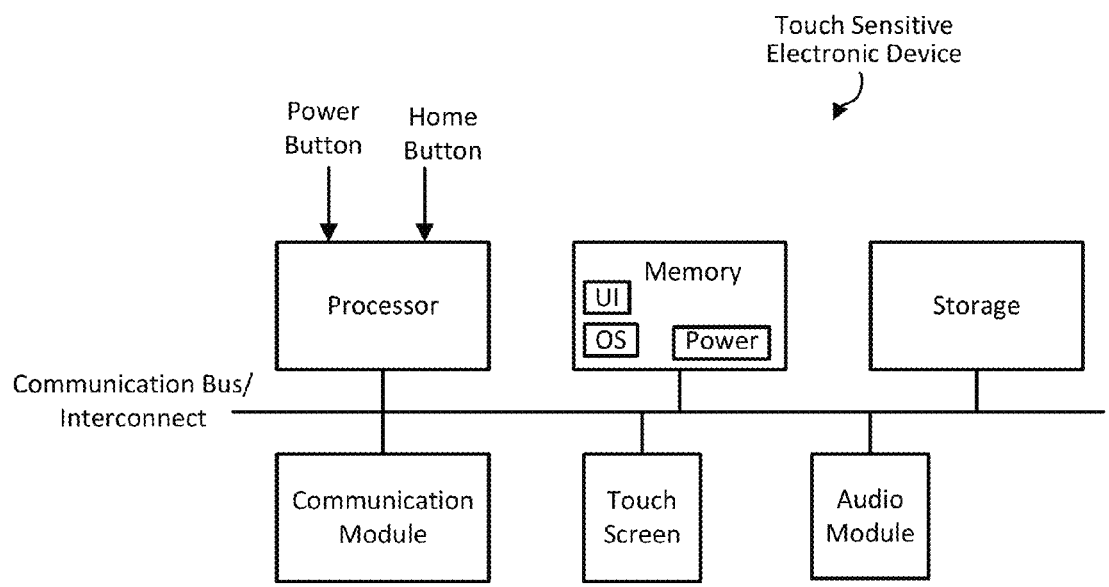
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc.). The touch screen and underlying circuitry is capable of translating a user's contact (direct or proximate) with the touch screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device including a UI having a swipe based file manager navigation mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 7 to 9 inch 1920×1280 IPS LCD touchscreen touch screen, or any other suitable display and touchscreen interface technology. The communications module can be, for instance, any suitable 802.11 b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 7" to 9" high by about 5" to 6" wide by about 0.5" thick, and weighs about 7 to 8 ounces. Any number of suitable form factors can be used, depending on the target application (e.g., laptop, desktop, mobile phone, etc.). The device may be smaller, for example, for smartphone and tablet applications and larger for smart computer monitor and laptop and desktop computer applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The UI module can be, for example, based on touchscreen technology and the various example screen shots and use-case scenarios shown in FIGS. 1a, 1c-d, 3a-d, 4a-d, and 5a-c, and in conjunction with the swipe based file manager navigation methodologies demonstrated in FIG. 6, which will be discussed in turn. The audio module can be configured to speak or otherwise aurally present, for example, a digital content sample, a selected eBook, or other textual content, and/or to provide verbal and/or other sound-based cues and prompts to guide the swipe based file manager navigation mode, as will be appreciated in light of this disclosure. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
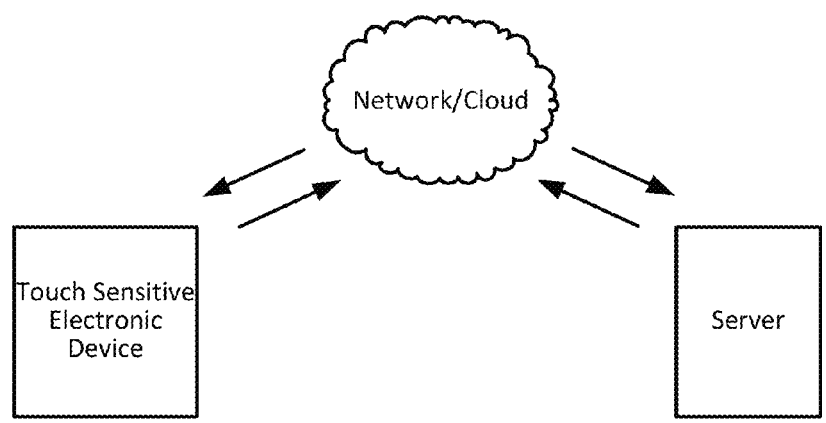
FIG. 2b illustrates a block diagram of a communication system including the electronic touch screen device of FIG. 2a, configured in accordance with an embodiment of the present invention.

FIG. 2b illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. Is some such embodiments, the server is configured to remotely provision a swipe based file manager navigation mode as provided herein to the touch screen device (e.g., via JavaScript or other browser based technology). In other embodiments, portions of the swipe based file manager navigation methodology can be executed on the server and other portions of the methodology can be executed on the device. Numerous server-side/client-side execution schemes can be implemented to facilitate a swipe based file manager navigation mode in accordance with an embodiment, as will be apparent in light of this disclosure.

Swipe Based File Manager Navigation Mode Examples

Figure 3A:
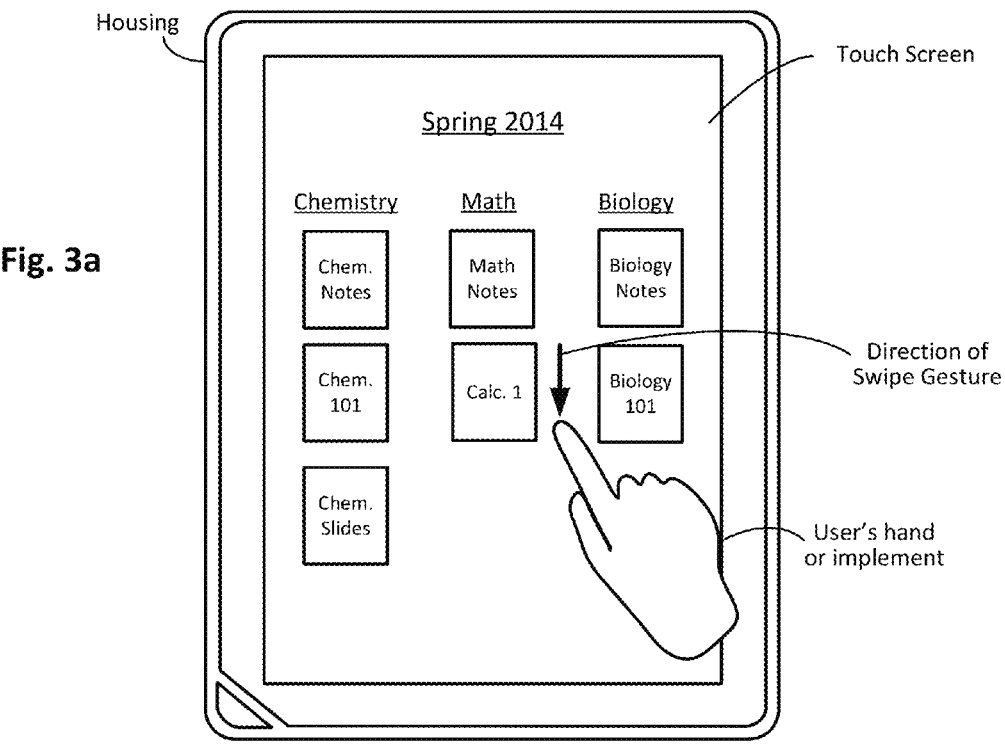
FIGS. 3a-d illustrate an example swipe based file manager navigation mode of an electronic touch screen device, in accordance with an embodiment of the present invention.

FIGS. 3a-d collectively illustrate an example swipe based file manager navigation mode that can be applied to a touch sensitive display of an electronic device, in accordance with an embodiment of the present invention. As can be seen in FIG. 3a, the device housing surrounds the touch screen of the device, and the device is displaying a number of digital files on the touch screen. As can be seen in this example, the device is displaying the course-level menu and files are organized into three columns based on three courses: chemistry, math, and biology. In this example, the chemistry column includes a chemistry notes file, a chemistry 101 digital textbook, and a chemistry slideshow; the math column includes a math notes file and a calculus 1 textbook; and the biology column includes a biology notes file and a biology 101 textbook. As can be further seen, each of the course columns is organized under the "Spring 2014" header located at the top of the screen, indicating that these courses correspond to the spring 2014 schedule. The user can interact with the touch screen with fingers or any other suitable implement, and in this particular example, the gesture to access a higher level is configured as a downward swipe gesture performed on the touch screen device and the gesture to access a lower level is configured as an upward swipe gesture performed over the digital content the user intends to access.

Figure 3B:
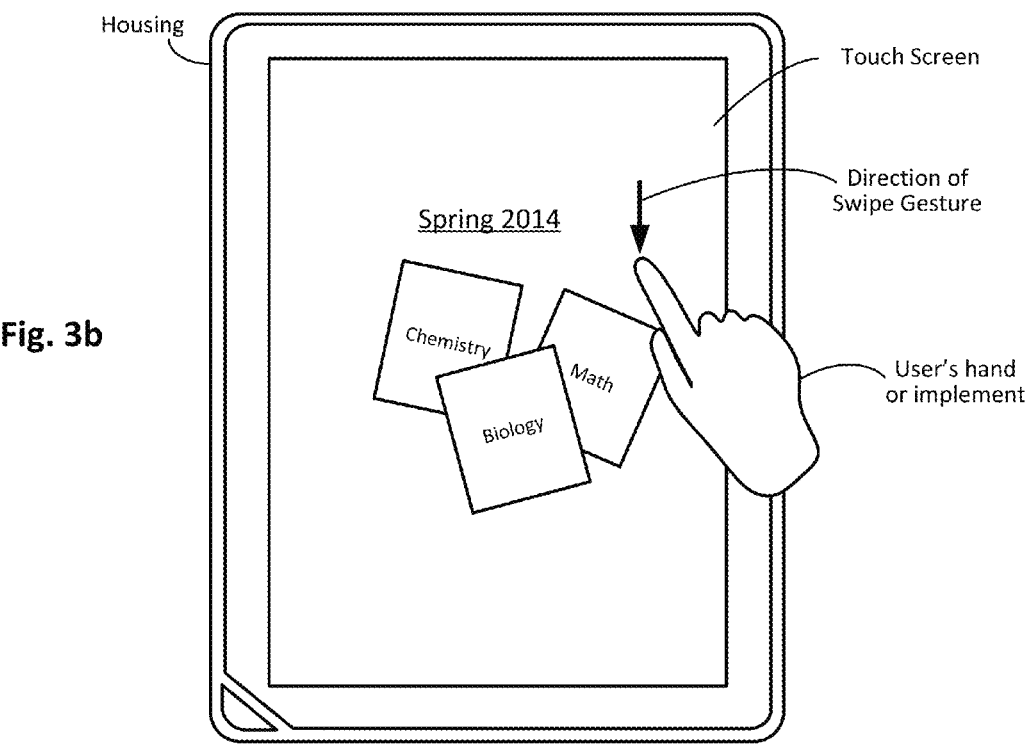
Figure 3C:
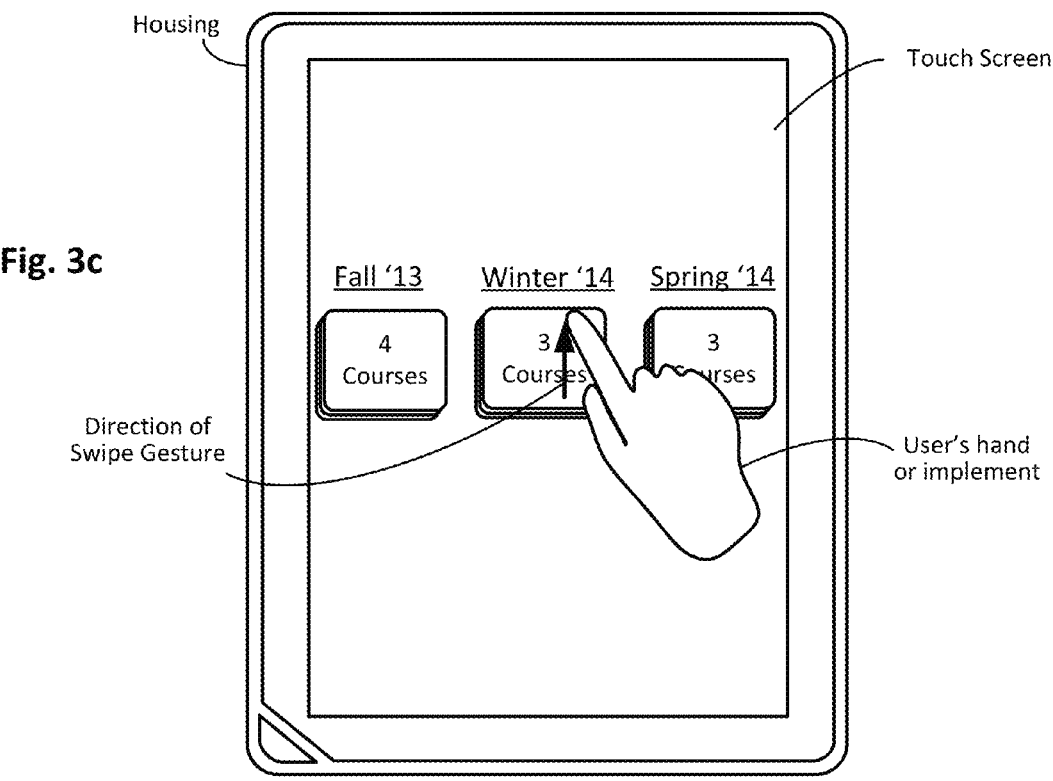
Figure 3D:
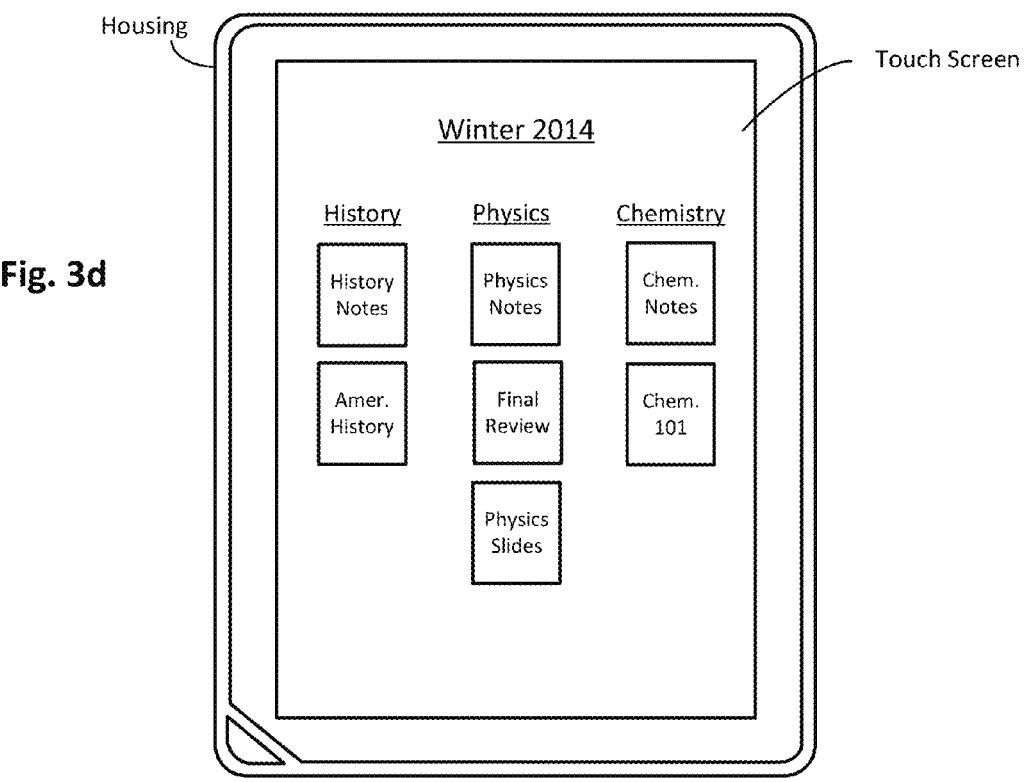

As can be seen in FIG. 3a, the user performs a downward swipe gesture and accesses the term or semester-level menu, shown in FIG. 3b, that displays three tiles or icons corresponding to the three courses in the spring 2014 schedule. The tiles may be arranged on a grid, in some embodiments, or clustered in a bundle or pile as shown in the example of FIG. 3b. In some embodiments, an animation may show the various file icons collapsing under course tiles and the course tiles collecting under the semester header. As can be seen in FIG. 3b, the user again performs a downward swipe gesture and accesses the multi-term-level menu, shown in FIG. 3c, that displays three term headers corresponding to the fall 2013, winter 2014, and spring 2014 terms. Each term header, in this example, is positioned over an icon or graphic indicating the number of courses included in each term schedule. In this particular example, the winter 2014 term includes 3 courses, and the user performs an upward swipe gesture over the portion of the screen corresponding to the winter 2014 term in order to access a lower level displaying more details about the courses in that term. As can be seen in FIG. 3d, after performing the upward swipe gesture the device is displaying the course-level menu for the winter 2014 term, which includes a number of files organized into three columns based on three courses: history, physics, and chemistry. In this example, the history column includes a history notes file and an American history textbook; the physics column includes a physics notes file, a final review file, and a physics slideshow; and the chemistry column includes a chemistry notes file and a chemistry 101 textbook. In one example, an animation may show the contents of the winter 2014 course shown in FIG. 3c spreading out and settling to show the course-level menu shown in FIG. 3d. In some embodiments, at any point during content navigation the user may access a file displayed on the device by tapping the file or performing some other suitable selection command, thus exiting the swipe based file manager navigation mode and accessing the desired file.

Figure 4A:
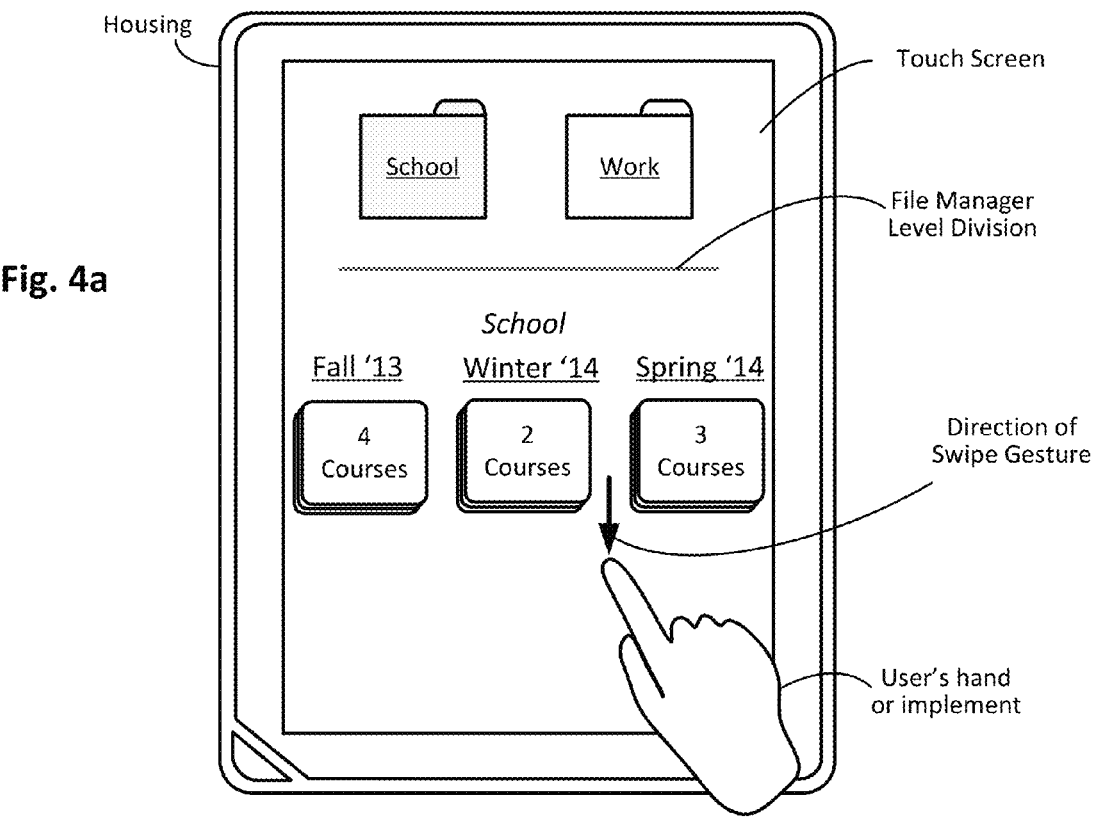
FIGS. 4a-d illustrate an example swipe based file manager navigation mode of an electronic touch screen device, in accordance with another embodiment of the present invention.

FIGS. 4a-d collectively illustrate an example swipe based file manager navigation mode that can be applied to a touch sensitive display of an electronic device, in accordance with another embodiment of the present invention. As can be seen in FIG. 4a, the device housing surrounds the touch screen of the device, and the device is displaying a number of file folders and directory locations on the touch screen. As can be seen in this example, a multi-term-level menu is displayed near the center of the device screen showing a "school" header and three term sub-headers corresponding to the fall 2013, winter 2014, and spring 2014 terms. Each term header, in this example, is positioned over an icon or graphic indicating the number of courses included in each term schedule. Above the term-level menu, a file manager or directory level division is displayed, above which is the next highest level in the content hierarchy. In this example embodiment, the next highest level includes two folders, one for school and one for work. As can be seen, the school folder is slightly shaded in order to indicate that it is the source of the term-level menu displayed at the center of the device screen. The user can interact with the touch screen with fingers or any other suitable implement, and in this particular example, the gesture to access a higher level is configured as a downward swipe gesture performed on the touch screen device and the gesture to access a lower level is configured as an upward swipe gesture performed over the digital content the user intends to access.

Figure 4B:
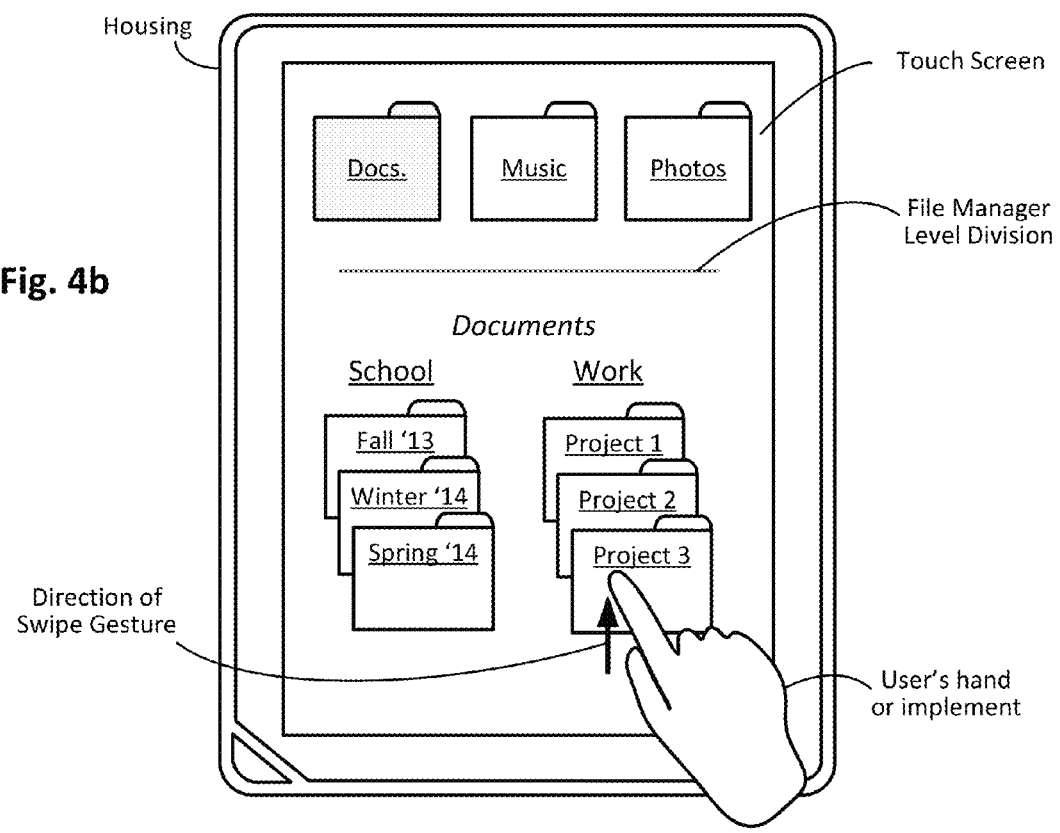

As can be seen in FIG. 4a, the user performs a downward swipe gesture over the touch screen device in order to access the next highest level, shown in FIG. 4b, which is displaying the school and work folders. In this example, the school folder includes three term sub-folders and the work folder includes three project sub-folders. As can be seen, above the documents-level menu, a file manager or directory level division is displayed, above which is the next highest level in the content hierarchy. In this particular example, the next highest navigation level includes three folders titled documents, music, and photos. In this particular example, the swipe based file manager navigation mode is configured (e.g., using the configuration sub-menu of FIG. 1d) to display two levels at once, so the multi-term-level menu shown in FIG. 4a disappears in FIG. 4b. As can be seen, the documents folder is slightly shaded in order to indicate that it is the source of the content displayed below the file manager or directory level division.

Figure 4C:
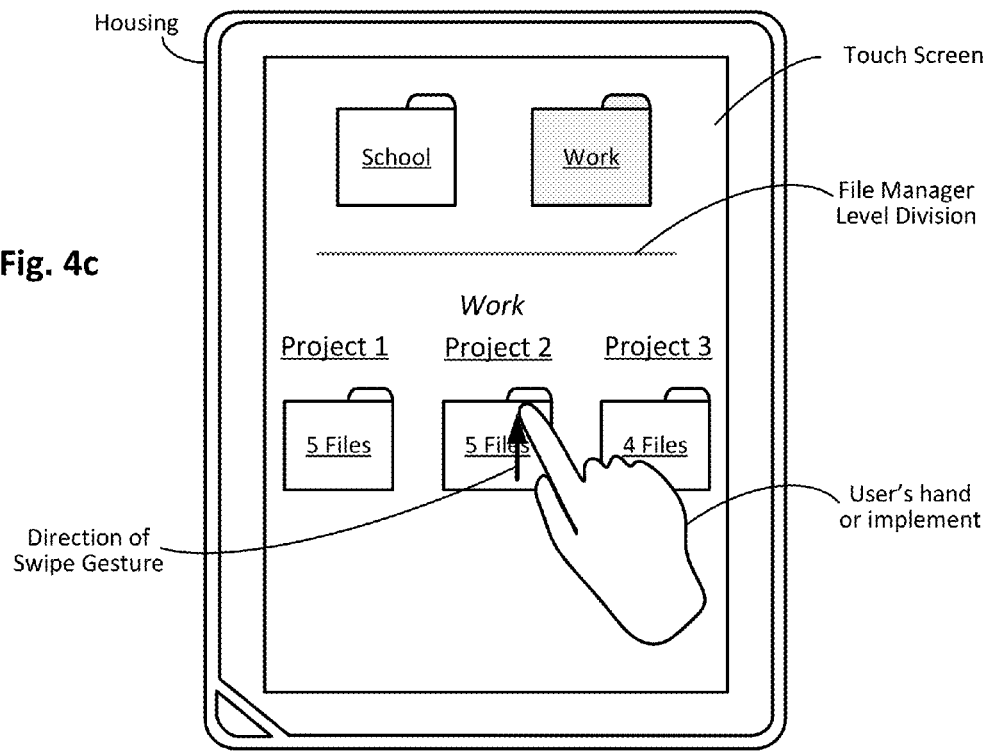
Figure 4D:
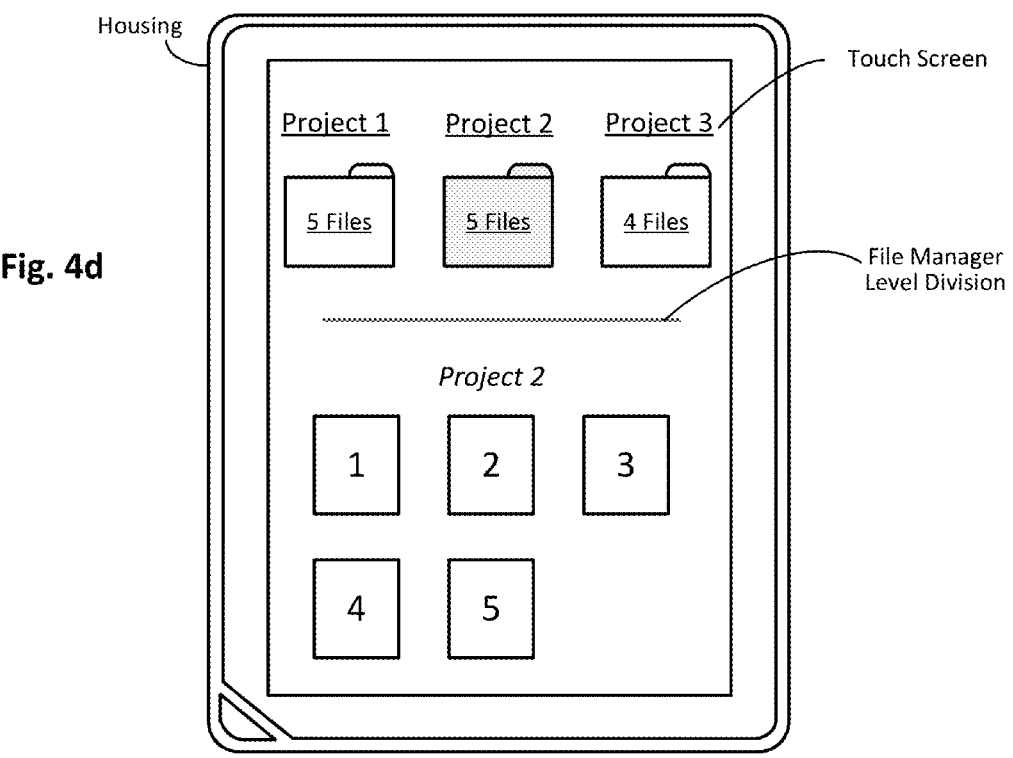

As shown in the example of FIG. 4b, the user performs an upward swipe gesture over the work folder, thus displaying the next lowest level, shown in FIG. 4c. This particular level includes sub-folders corresponding to the three work projects within the work folder. In this example, the work folder in the upper level above the file manager or directory level division is shaded in order to indicate that it is the source folder for the three work sub-folders. As can be seen, the project 1 folder includes 5 files, the project 2 folder includes 5 files, and the project 3 folder includes 4 files. As shown in FIG. 4c, the user performs another upward swipe gesture over the project 2 folder, thus accessing the 5 files within that folder, shown in FIG. 4d. In this particular example, the higher level folder for project 2 is shaded in order to indicate that it is the source folder for the five documents displayed below.

Figure 5A:
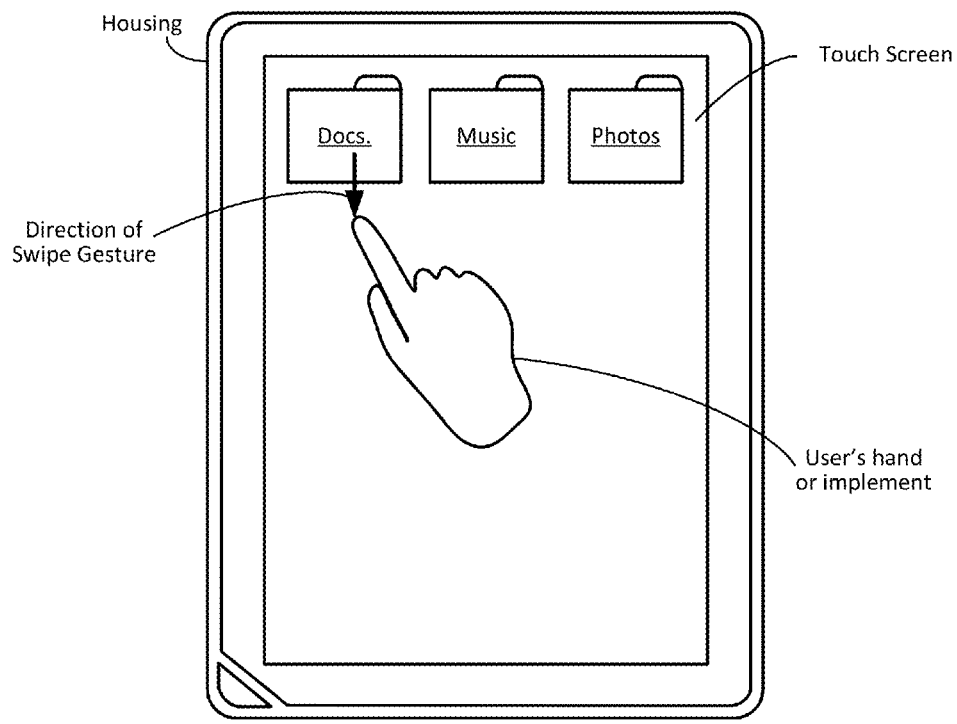
FIGS. 5a-c illustrate an example swipe based file manager navigation mode of an electronic touch screen device, in accordance with another embodiment of the present invention.
Figure 5B:
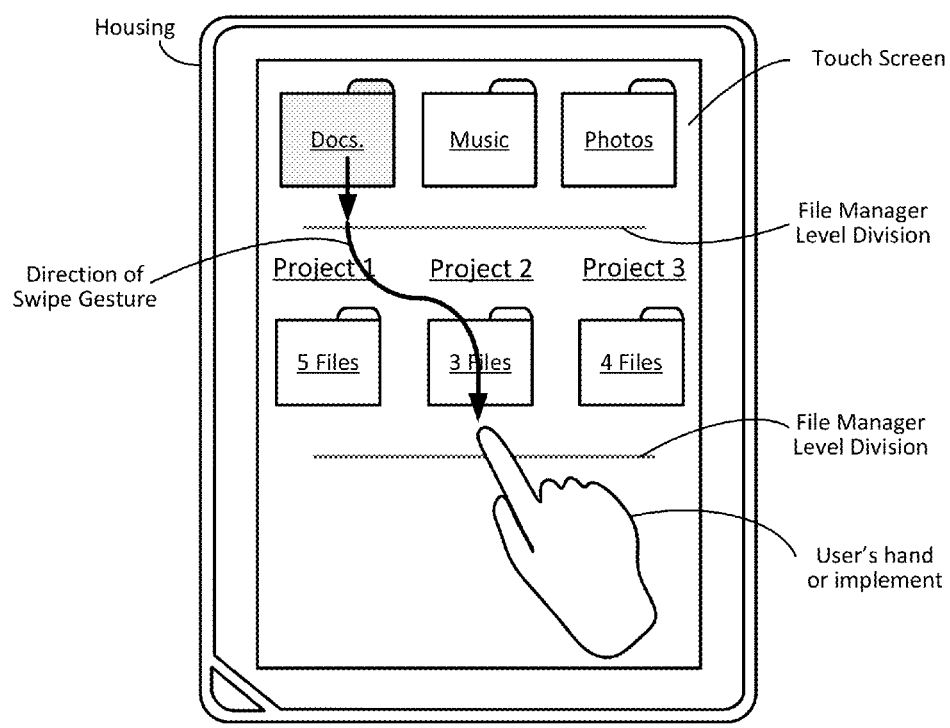
Figure 5C:
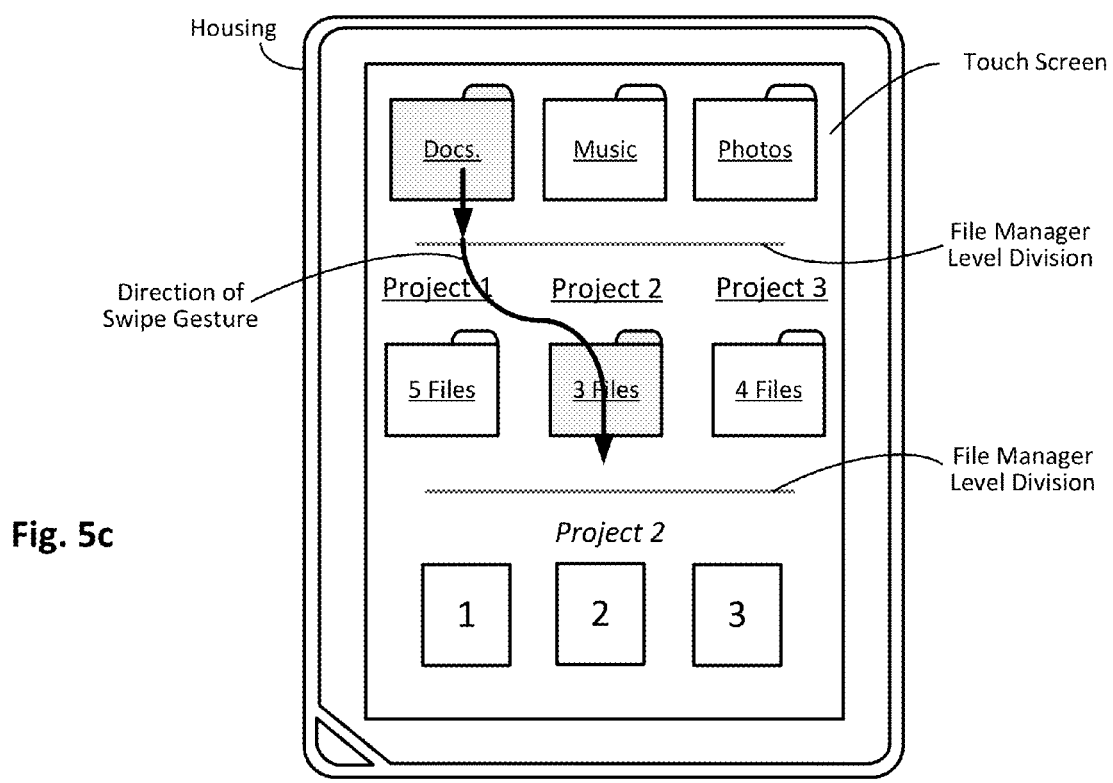

FIGS. 5a-c collectively illustrate an example swipe based file manager navigation mode that can be applied to a touch sensitive display of an electronic device, in accordance with another embodiment of the present invention. As can be seen in FIG. 5a, the device housing surrounds the touch screen of the device, and the device is displaying three file folders titled documents, music, and photos. The user can interact with the touch screen with fingers or any other suitable implement, and in this particular example, the gesture to access a lower level is configured as a downward swipe gesture performed on the touch screen device over the folder the user wishes to access. As can be seen in this example, the user performs a downward swipe over the documents folder in order to access the contents of that folder, which are shown in the lower level of FIG. 5b. This lower level includes folders for projects 1-3 included within the work folder. As can be seen in FIG. 5b, the work folder is shaded in order to indicate that it is the source of the folders for projects 1-3. As described above, two or more file manager navigation gestures may be combined into a single fluid gesture, in some embodiments. Such an example embodiment may be seen in FIG. 5b, wherein the path of the swipe gesture slides sideways before again swiping downward over the project 2 folder. After the downward swipe gesture has been performed over the project 2 folder, the contents of project 2 are displayed, as shown in FIG. 5c. In this particular embodiment, the project 2 folder includes three files and the swipe based file manager navigation mode is configured to display all three levels at once, each separated by a file manager or directory level division.

Methodology

Figure 6:
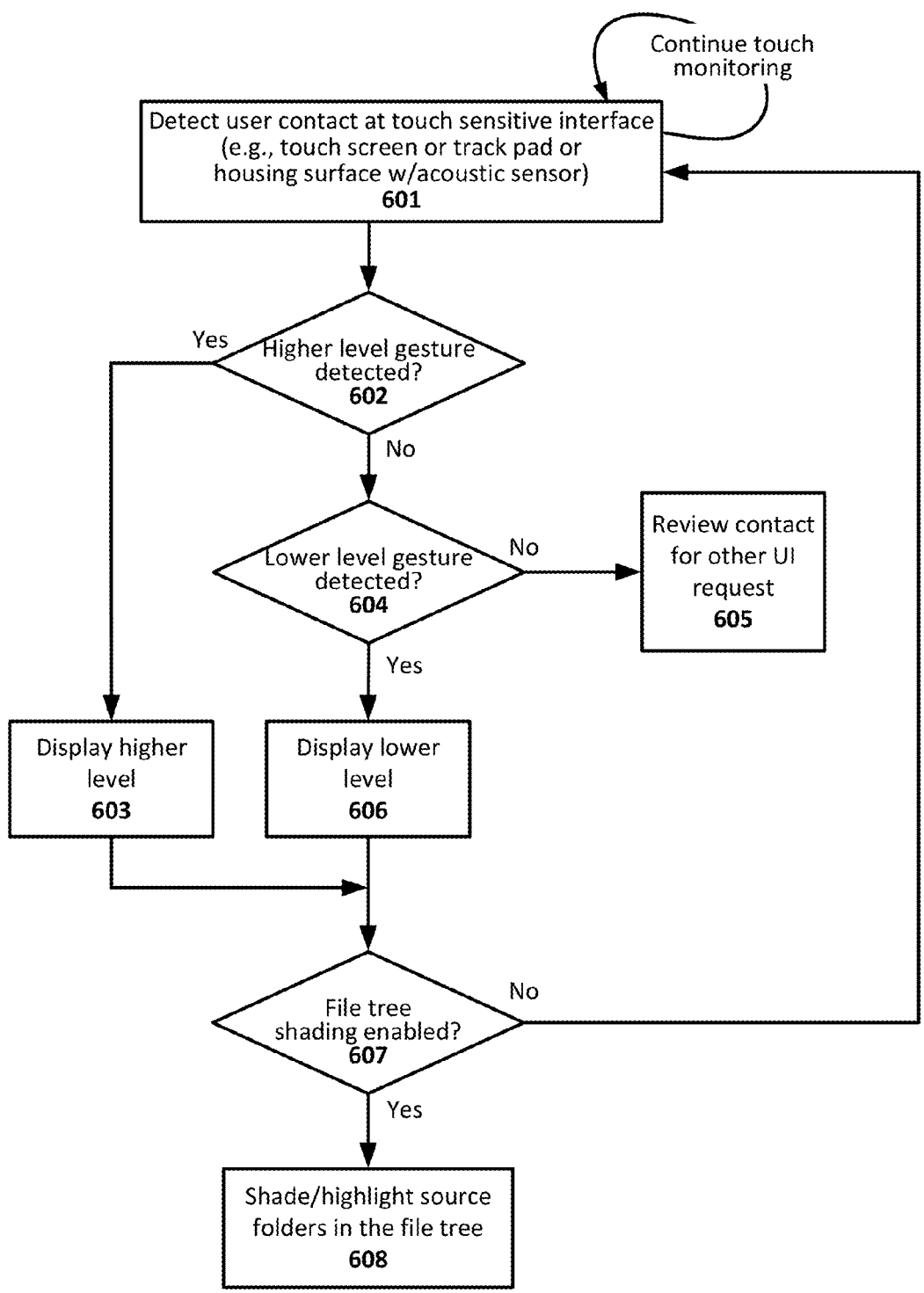
FIG. 6 illustrates a method for providing a swipe based file manager navigation mode in an electronic touch screen device, in accordance with an embodiment of the present invention.

FIG. 6 illustrates a method for providing a swipe based file manager navigation mode in an electronic touch screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the swipe based file manager navigation mode can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a swipe gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases contact without moving the contact point, a tap or press or press-and-hold command may be assumed depending on the amount of time the user was continually pressing on the touch sensitive screen. These main detections can be used in various ways to implement UI functionality, including a swipe based file manager navigation mode as variously described herein, as will be appreciated in light of this disclosure.

In this example case, the method includes detecting 601 a user contact on the touch sensitive interface. As described above, the contact may be performed in any suitable manner using a stylus, the user's finger, or any other suitable implement, and it may be performed on a touch screen surface, a track pad, acoustic sensor, or other touch sensitive surface. The user contact monitoring is essentially continuous. In other embodiments, the user input may be, for example, a mouse-based signal, or any other user interface input. Once a user contact or other input has been detected, the method may continue with determining 602 whether the higher level gesture is detected. If the higher level navigation gesture is detected, the method may continue with displaying 603 (or otherwise presenting) the higher level of the file manager on the device display. If no higher level navigation gesture is detected, the method may continue with determining 604 whether a lower level navigation gesture is detected. As described above, in some embodiments the various level navigation gestures may be user configurable or hard coded, and they may include upward or downward swipe gestures performed on a touch sensitive display screen. If no lower level navigation gesture is detected, the user contact may be reviewed 605 for some other UI request. If a lower level navigation gesture is detected, the method may continue with displaying 606 (or otherwise presenting) the lower level of the file manager on the device display. The method may continue with determining 607 whether file tree shading is enabled. As described above, a shading function may be enabled to indicate to the user (e.g., by highlighting, shading, or otherwise altering folders in appearance or size) the source of content in the lower levels of the file manager. Such a function allows the user to easily identify the source of the lower levels by identifying the shaded folders in the higher levels of the file tree. If no file tree shading function is enabled, the method may resume user touch monitoring 601 as described above. If the file tree shading function is enabled, the method may continue with shading, highlighting, or otherwise altering the appearance of source folders within the file tree.

Numerous variations and embodiments will be apparent in light of this disclosure. One example embodiment of the present invention provides an electronic device including a display for presenting a hierarchical digital content directory to a user, and a user interface including a file manager navigation mode configured to allow a user to access higher directory levels in response to a higher level navigation gesture and access lower directory levels in response to a lower level navigation gesture. The navigation mode is further configured to provide an animation showing directory content collapsing into a source folder in response to a higher level navigation gesture and provide an animation showing a folder expanding to present its contents in response to a lower level navigation gesture. In some cases, at least one of the higher level navigation gesture and/or the lower level navigation gesture is user configurable. In some cases, the animations are user configurable. In some cases, the lower level navigation gesture and higher level navigation gesture are swipe gestures oriented in substantially opposite directions. In some cases, the navigation mode is further configured to present multiple directory levels at the same time. In one such case, the number of directory levels presented is user configurable. In another such case, separate directory levels are separated by a level division. In another such case, higher directory levels of the file manager are configured to present only source folders for the lower directory levels. In another such case, higher directory levels include source folders for lower directory levels and the source folders are shaded and/or highlighted. In some cases, the lower level navigation gesture is a continuous swipe gesture configured to access multiple directory levels of the file manager. In some cases, the lower level navigation gesture is performed over a folder intended to be accessed.

Another example embodiment of the present invention provides a mobile computing system. The system includes a processor, a touch screen display for displaying a hierarchical digital content directory to a user, and a user interface executable on the processor and including a swipe based file manager navigation mode. The swipe based file manager navigation mode is configured to display an animation showing directory content collapsing into a source folder in response to a substantially vertical higher level swipe gesture, and display an animation showing directory content expanding into a lower directory level in response to a lower level swipe gesture oriented in a direction opposite the higher level swipe gesture. In some cases, the navigation mode is further configured to display multiple directory levels at the same time. In some cases, a higher directory level includes a source folder for a lower directory level and the source folder is shaded and/or highlighted. In some cases, the animations are accompanied by a sound effect and/or graphic.

Another example embodiment of the present invention provides a computer program product including a plurality of instructions non-transiently encoded thereon and executable by one or more processors to carry out a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In one such example embodiment, the process is configured to: present via an electronic device a current level of a hierarchical digital content directory; present via the electronic device, an animation showing directory content collapsing into a higher directory level in response to a higher level navigation gesture; and present via the electronic device, an animation showing directory content expanding into a lower directory level in response to a lower level navigation gesture. In some cases, the process further comprises: present via the electronic device multiple directory levels at the same time. In some cases, the number of directory levels presented is user configurable. In some cases, the lower level navigation gesture is performed over a folder intended to be accessed. In some cases, the lower level navigation gesture is a swipe gesture performed in a direction opposite the higher level swipe gesture.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An electronic device, comprising:
a display for presenting a hierarchical digital content directory to a user; and
a user interface including a file manager navigation mode configured to allow a user to access higher directory levels in response to a higher level navigation gesture and access lower directory levels in response to a lower level navigation gesture;
wherein the navigation mode is further configured to provide:
a first animation showing one or more sub-headers and content associated with each sub-header of a lower directory level collapsing into a graphic associated with a higher directory level in response to a higher level navigation gesture, wherein the graphic is associated with a header of the higher directory level and is labeled with a description and a number so as to provide a semantic view of the lower directory level, the description being descriptive of the one or more sub-headers of the lower directory level, and the number identifying a quantity of the sub-headers of the lower directory level; and
a second animation showing the graphic expanding to present the one or more sub-headers and the content associated with each sub-header in response to a lower level navigation gesture, wherein the one or more sub-headers are simultaneously presented with the header of the higher directory level, and wherein the content is positioned such that each content item is related to one of the sub-headers.

2. The device of claim 1 wherein at least one of the first animation, the second animation, the higher level navigation gesture, and the lower level navigation gesture is user configurable.

3. The device of claim 1 wherein if a given lower directory level has no sub-headers, the corresponding higher directory level is represented by a graphic that is labelled with a number that identifies a quantity of files stored in that given lower directory level.

4. The device of claim 1 wherein the lower level navigation gesture and the higher level navigation gesture are swipe gestures oriented in substantially opposite directions.

5. The device of claim 1 wherein the navigation mode is further configured to present multiple directory levels at the same time.

6. The device of claim 1 wherein the number identifying a quantity of the sub-headers of the lower directory level may be less than the total number of content items of the lower directory level.

7. The device of claim 5 wherein separate directory levels are separated by a level division.

8. The device of claim 1 wherein each graphic associated with at least one higher directory level is organized under a respective header of the higher directory level.

9. The device of claim 1 wherein a given higher directory level includes a plurality of source folders, each source folder associated with one or more lower directory levels, and a displayed one of the source folders is, after its selection, at least one of shaded and highlighted to indicate that it is the source folder of corresponding lower level content items also displayed in response to the selection.

10. The device of claim 1 wherein multiple directory levels of the file manager can be accessed and simultaneously presented for display in response to a continuous swipe gesture that passes through a content item of each directory level.

11. The device of claim 1 wherein the lower level navigation gesture is performed over a graphic intended to be expanded.

12. A mobile computing system, comprising:
a processor;
a touch screen display for displaying a hierarchical digital content directory to a user; and
a user interface executable on the processor and including a swipe based file manager navigation mode configured to display:
a first animation showing one or more sub-headers and content associated with each sub-header of a lower directory level collapsing into a graphic associated with a higher directory level in response to a substantially vertical higher level swipe gesture, wherein the graphic is organized under a header of the higher directory level and is labeled with a description and a number so as to provide a semantic view of the lower directory level, the description being descriptive of the one or more sub-headers of the lower directory level, and the number identifying a quantity of the sub-headers of the lower directory level; and
a second animation showing the graphic expanding to present the one or more sub-headers and the content associated with each sub-header in response to a lower level swipe gesture oriented in a direction opposite the higher level swipe gesture, wherein the one or more sub-headers are simultaneously presented with the header of the higher directory level, and wherein the content is positioned such that each content item is related to one of the sub-headers.

13. The system of claim 12 wherein the navigation mode is further configured to display multiple directory levels at the same time.

14. The system of claim 13 wherein a higher directory level includes a source folder for a lower directory level and the source folder is, when selected, at least one of shaded and highlighted, so as to indicate that it is the source folder of corresponding lower level content items also displayed in response to the selection.

15. The device of claim 12 wherein the animations are accompanied by at least one of a sound effect and graphic.

16. A non-transitory computer program product comprising a plurality of instructions encoded thereon that when executed by one or more processors a process to be carried out for navigating hierarchical digital content having multiple directory levels, the process comprising:
present via the electronic device, a first animation showing one or more sub-headers and content associated with each sub-header of a lower directory level collapsing into a graphic associated with a higher directory level in response to a higher level navigation gesture, wherein the graphic is associated with a header of the higher level and is labeled with a description and a number so as to provide a semantic view of the lower directory level, the description being descriptive of the one or more sub-headers of the lower directory level, and the number identifying a quantity of the sub-headers of the lower directory level; and
present via the electronic device, a second animation showing the one or more sub-headers and the content associated with each sub-header expanding into a lower directory level in response to a lower level navigation gesture, wherein the one or more sub-headers are simultaneously presented with the header of the higher directory level, and wherein the content is positioned such that each content item is related to one of the sub-headers.

17. The computer program product of claim 16, wherein the process further comprises: present via the electronic device multiple directory levels at the same time.

18. The computer program product of claim 16 wherein the number identifying a quantity of the sub-headers of the lower directory level may be less than the total number of content items of the lower directory level.

19. The computer program product of claim 16 wherein the lower level navigation gesture is performed over a graphic intended to be expanded.

20. The computer program product of claim 16 wherein the lower level navigation gesture is a swipe gesture performed in a direction opposite the higher level navigation gesture.

* * * * *